United States Patent [19]

Chaloner-Gill et al.

[11] Patent Number: 5,580,680
[45] Date of Patent: Dec. 3, 1996

[54] CATALYST CONTAINING SOLID ELECTROLYTES

[76] Inventors: Benjamin Chaloner-Gill, 520 Mansion Ct., #303, Santa Clara, Calif. 95054; Ib I. Olsen, 700 S. Saratoga Ave., #W301, San Jose, Calif. 95129; Eileen S. Saidi, 492 Capitol Village Cir., San Jose, Calif. 95136

[21] Appl. No.: 267,066

[22] Filed: Jun. 27, 1994

[51] Int. Cl.$^6$ ..................................... H01M 6/16
[52] U.S. Cl. ................ 429/192; 429/218; 429/194; 204/421; 252/62.2; 252/500
[58] Field of Search ................ 204/421; 429/192, 429/218, 194; 252/62.2, 500

[56] References Cited

U.S. PATENT DOCUMENTS

| | | | |
|---|---|---|---|
| 4,195,014 | 3/1980 | Dorfmann et al. | 260/45.75 R |
| 5,001,023 | 3/1991 | Cheshire et al. | 429/192 |
| 5,096,561 | 3/1992 | Akhtar | 429/192 |
| 5,169,736 | 12/1992 | Bittihne et al. | 429/194 |
| 5,354,631 | 10/1994 | Chaloner-Gill | 429/215 |

OTHER PUBLICATIONS

Odian, George, "Principles of Polymerization", 2nd edition, John Wiley and Sons, New York, 1981, pp. 194–197, 342–349, and 508–511.

*Primary Examiner*—Bruce F. Bell
*Attorney, Agent, or Firm*—Charles Jew

[57] ABSTRACT

A solid electrolyte that includes (1) a first catalyst that is capable of initiating the polymerization of solvent components at elevated temperatures in order to increase the resistance (or impedance) of the solid electrolyte and thereby prevent thermal runaway and/or (2) a second catalyst that is capable of initiating the polymerization of flammable substances (e.g., olefins) in the solvent and batteries make therefrom are provided. To assure that the catalysts do not prematurely initiate polymerization below a certain temperature, the catalysts may be microencapsulated within a heat sensitive material that disintegrates or dissolve at a predetermined elevated temperature to release the catalysts. Microencapsulation permits the controlled release of the catalysts into the electrolyte under the appropriate conditions.

30 Claims, No Drawings

5,580,680

1

CATALYST CONTAINING SOLID ELECTROLYTES

FIELD OF THE INVENTION

The present invention relates to solid electrochemical devices and, more particularly, to solid solvent-containing electrolytes having microencapsulated catalysts. The invention also relates to solid electrolytes that contain (1) first catalysts that are capable of polymerizing solvent components at elevated temperatures to thereby increase the resistance of the solid electrolyte and prevent thermal runaway and/or (2) second catalysts that are capable of polymerizing flammable substances such as olefins in the solvent.

BACKGROUND OF THE INVENTION

Electrolytic cells containing an anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features.

In solid batteries the solid electrolyte is interposed between the cathode and anode. The solid electrolyte contains either an inorganic or an organic matrix as well as a suitable inorganic salt. The inorganic matrix may be non-polymeric [e.g., β-alumina, silicon dioxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic constituents include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O—$ where R' is hydrogen or lower alkyl of from 1–6 carbon atoms. Because of the expense and difficulty in shaping inorganic non-polymeric matrices into the desired configurations, solid electrolytes containing polymeric matrices are preferred.

The solid electrolytes may also contain a solvent (plasticizer) which is typically added to the matrix in order to enhance the solubility of the inorganic salt in the solid electrolyte and thereby increase the conductivity of the electrolytic cell. Suitable solvents well known in the art for use in such solid electrolytes include, by way of example, propylene carbonate, ethylene carbonate, γ-butyrolactone, tetrahydrofuran, glyme (1,2-dimethoxyethane), diglyme, triglyme, tetraglyme, dimethylsulfoxide, dioxolane, sulfolane and the like.

Successful use of lithium batteries depends on their safety during operations under normal conditions and even under abusive usage. An abusive use such as short circuiting or rapid overcharging of the battery may initiate self-heating of the battery, as opposed to merely resistive heating, leading to thermal runaway. The main processes causing self-heating of a secondary lithium cell involve the chemical reaction between cycled lithium and electrolyte. While it was previously believed that the temperature of onset of the first thermal interaction between lithium and electrolyte solvent is near 125° C., it is now known that the reactions are initiated at temperatures near 100° C. At temperatures greater than 100° C., contributions to cell self-heating come from exothermic decomposition of the electrolyte as well as

2 reaction between lithium and the electrolyte salt. U. von Sacken and J. R. Dahn, Abstract 54, p. 87, The Electrochem. Soc. Extended Abstracts, Vol. 90–2, Seattle, Wash., Oct. 14–19, 1990. Thermal runaway is particularly undesirable because it can lead to ignition of the electrolytic cell.

In view of the above shortcomings associated with prior art solid state electrochemical devices, there is a need for solid electrolytes that include mechanisms than can prevent thermal runaways and related problems.

SUMMARY OF THE INVENTION

The present invention is directed to a solid electrolyte that includes (1) a first catalyst that is capable of initiating the polymerization of solvent components at elevated temperatures in order to increase the resistance (or impedance) of the solid electrolyte and thereby inhibiting thermal runaway and/or (2) a second catalyst that is capable of initiating the polymerization of flammable substances (e.g., olefins) in the solvent. To assure that the catalysts do not prematurely initiate polymerization until a high enough temperature in the electrolyte is reached, the catalysts may be microencapsulated within a heat sensitive material that disintegrates at a predetermined elevated temperature to release the catalysts. Microencapsulation permits the controlled release of the catalysts (or any other suitable substance that can be so incorporated), into the electrolyte under the appropriate conditions.

In one compositional aspect, the invention is directed to a solid electrolyte comprising:

a solid polymeric matrix;

an inorganic salt;

a solvent; and a catalyst selected from the group consisting of solvent polymerizing catalysts and volatile material polymerization catalysts and mixtures thereof.

In a further compositional aspect, the invention is directed to an electrochemical cell comprising:

an anode;

a cathode; and interposed between said anode and cathode, a polymeric electrolyte comprising:

(i) a solid polymeric matrix;

(ii) an inorganic salt;

(iii) a solvent; and (iv) a catalyst selected from the group consisting of solvent polymerizing catalysts and volatile material polymerization catalysts and mixtures thereof.

The invention is also directed to batteries comprising the electrochemical cells.

In one preferred embodiment, the catalysts are microencapsulated. In another preferred embodiment, the solvent comprises propylene carbonate and the volatile materials catalysts are effective in polymerizing olefins. In yet another preferred embodiment, the solvent polymerizing catalysts include ring-opening polymerization catalysts and the volatile materials catalysts include Ziegler-Natta catalysts and peroxides.

DETAILED DESCRIPTION OF THE PREFERRED EMBODIMENTS OF THE INVENTION

The present invention encompasses solid electrolytes having catalysts that are capable of: (1) initiating the polymerization of solvent components, when the temperature of the solid electrolyte reaches a critical temperature, and (2) polymerizing flammable substances found in the solvent (e.g., olefins) that may otherwise ignite. The invention is also directed to the microencapsulation of the catalysts in a heat sensitive material that dissolves or disintegrates at a predetermined temperature to release the catalysts. Microencapsulation ensures that the catalysts will be released into the solid electrolyte only under appropriate conditions.

The present invention is applicable to secondary solid electrolytic cells and batteries in general although the following description of the invention will be illustrated using secondary lithium cells and batteries.

However, prior to describing this invention in further detail, the following terms will be defined.

The term "solid polymeric matrix", as used herein, refers to a polymer made by polymerizing or copolymerizing monomer(s) or prepolymer(s) or oligomer(s). Certain solid polymeric matrices useful in the preparation of solid polymeric electrolytes are well known in the art and are described, for example, in U.S. Pat. Nos. 4,908,283 and 4,925,751, both of which are incorporated herein by reference in their entirety.

The term, "a solid polymeric matrix forming monomer or polymer precursor" refers to inorganic or organic materials which in monomeric, oligomeric or polymeric form can be polymerized, or further polymerized, as by cross-linking, preferably in the presence of a salt and a solvent, to form solid polymeric matrices which are suitable for use in solid polymeric electrolytes in electrochemical cells.

The term "compatible electrolyte solvent", or in the context of components of the solid electrolyte, just "solvent", is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $[N(SO_2CF_3)_2]$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The "anode" refers to an electrode for the half-cell reaction of oxidation on discharge, which is typically comprised of a compatible anodic material, i.e. any material which functions as an anode in a solid electrochemical cell. Such compatible anodic materials are well known in the art and include, by way of example, lithium, lithium alloys, such as alloys of lithium with aluminum, mercury, iron, zinc and the like, and intercalation-based anodes such as carbon, tungsten oxide and the like.

The "cathode" refers to the counter-electrode to the anode and is typically composed of a compatible cathodic material (i.e., insertion compounds) which is any material which functions as a cathode in an electrochemical cell. Such compatible cathodic materials are well known to the art and include by way of example, manganese oxides, molybdenum oxides, vanadium oxides, such as $V_6O_{13}$, sulfides of molybdenum, titanium and niobium, lithiated cobalt oxides, lithiated manganese oxides, lithiated nickel oxides, chromium oxides, copper oxides, and the like. The particular compatible cathodic material employed is not critical.

The term "thermal runaway onset temperature" refers to the temperature at which the onset of the first thermal interaction between the electrode materials and the electrolyte occurs. For secondary lithium electrochemical cells or batteries, this temperature is approximately 100° C. Thermal runaway ensues if the thermal interaction continues unchecked.

The term "heat sensitive microcapsule material" or "heat sensitive material" refers to any suitable material which is capable of being liquified or disintegrated by heat and which, at temperatures below the point of being liquified or disintegrated, does not adversely affect the electrochemical cell or battery. That is, the material will flow above a certain temperature, which for this invention, is referred to as the melting point. While any compatible material may be used as the heat sensitive material in the present invention, it preferably melts at a temperature that is less than the thermal runaway onset temperature for a particular electrochemical cell. For lithium batteries, the heat sensitive materials used should have a melting point that is in the range from about 90° C. to about 120° C., preferably from about 95° C. to about 110° C. Heat sensitive materials can be readily fabricated from certain thermoplastic resins and waxes.

The term "thermoplastic resin" refers to resins (i.e. plastics) which can be repeatedly softened by heating and hardened again upon cooling. Important polymers and oligomers of which such resins are composed include polyethylene, polypropylene, polyvinylchloride, and polystyrene. The heat sensitive material may be a substantially uniform mixture of a thermoplastic resin and a compatible plasticizer in a weight ratio of from about 1:1 to about 100:1 (resin:plasticizer). Such plasticizers are well known to the art.

As further non-limiting examples, the heat sensitive material may be a high melting point wax, although a thermoplastic polymer or oligomer is preferred, preferably a polymerized polyolefin. Specifically, polyethylene or polypropylene are preferred, for example low density polyethylene is suitable, as are linear low density and high density polyethylene. Polypropylene may be used an atactic, isotactic or syndiotactic polypropylene. Therefore, in general, the preferred polyolefin heat sensitive material may be amorphous or crystalline. While amorphous polymers may be preferred for lower melting points, in some circumstances crystalline polymers may be preferred for their sharper melting points under other circumstances. Examples of such thermoplastic resins include polyethylene (Allied Signal, Inc., grades C-9, C-6, C-5, C-18 or A-617), low density polyethylene (Plast Labor, SA COATHYLENE (TM), HA 1591, or HX 1591) or ethylene-vinyl acetate copolymer (Allied Signal, Inc., grades 400, 405 or 430; Plast Labor, SA COATHYLENE (TM) CB 3547).

The term "microcapsule" refers to a structure, formed from a heat sensitive material, having catalysts entrapped (or enclosed) therein. In one embodiment, the catalysts are located in the center (or core) of the microcapsule that has a thick outer shell comprised of heat sensitive materials. In another embodiment, the microcapsule is an agglomerate wherein the catalysts are impregnated throughout the mass of heat sensitive material. Regardless of the particular form of the microcapsule, the catalysts therein should be shielded from the electrolyte environment until the heat sensitive material melts. The thermoplastic resins or waxes when used as microcapsules are in the form of finely divided particles, i.e. powders, of average particle size in the range of from about 1μ to 20μ, and more preferably from about 1μ to about 10μ. Microencapsulation is accomplished by methods known to the art, such as re-crystallization from solution, spray-drying, emulsion polymerization, suspension polymerization, fluidized bed polymerization, and so forth. Catalysts that can be microencapsulated include the solvent polymerizing catalysts and volatile material polymerization catalysts described below. As is apparent, solvent polymerizing and/or volatile materials catalysts that are microencapsulated must be compatible with the heat sensitive material employed so that the catalysts remained intact in the microcapsule until it melts.

The term "catalyst" shall include initiators even though initiators are consumed in a chemical reaction whereas catalysts are not. Thus, species that "catalyze" polymerization shall include those that "initiate" such reactions.

The term "solvent polymerizing catalyst" refers to preferably temperature activated catalysts that catalyze or initiate the polymerization of compatible electrolyte solvents (e.g., propylene carbonate) when the solid electrolyte reaches a certain threshold temperature. The polymerization forms oligomers and polymers which cause the internal resistance (or impedance) of the solid electrolyte to increase and thereby inhibit thermal runaway. The specific solvent polymerization catalysts used depend on the types of electrolyte solvents (plasticizers) employed and the thermal runaway onset temperature of the electrochemical cell or battery. For instance, with secondary lithium batteries, wherein the solvent includes cyclic monomers such as propylene carbonate, which has structural formula I, is employed, the preferred solvent polymerization catalysts catalyze or initiate anionic or cationic ring-opening polymerization and have an activation temperature that is preferably in the range from about 90° to about 120° C., and more preferably from about 95° to about 110° C. As a way of illustration, ring-opening catalysts include transitional metal oxides, e.g., $TiO_2$; strong acids and bases; and Na, $RO^-$ and $BF_3$. Although the thermal activated solvent polymerizing catalysts are chosen so that the particular catalyst employed in a solid solvent-containing electrolyte has an activation temperature that is near or just below the thermal runaway onset temperature, the catalyst can also be microencapsulated in the appropriate heat sensitive material which melts at the thermal runaway onset temperature. This assures that the catalyst does not initiate solvent polymerization prematurely and prevents catalyst degradation. The amount of catalyst incorporated into the solid electrolyte should be sufficient to polymerize enough solvent in order to increase the impedance and thereby lower the ohmic heating of the solid electrolyte.

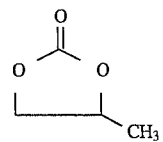

(I)

The solvent polymerizing catalyst also includes catalysts that are not temperature activated. In this case, microencapsulation is necessary to ensure that the catalysts are not released until the solid electrolyte reaches a predetermined temperature.

The term "volatile material polymerization catalyst" refers to catalysts that catalyze or initiate polymerization of potentially hazardous volatile substances that are present in the solid electrolyte particularly at elevated temperatures. The polymerization produces inert (or less reactive) oligomers and polymers which can gradually increase the internal resistance (or impedance) of the solid electrolyte as the oligomer and polymers accumulate. This process effectively removes flammable materials and helps inhibit thermal runaway. Although not necessary, the volatile materials catalyst is preferably thermally activated and has an activation temperature that is near or just below the thermal runaway onset temperature of the cell or battery. For lithium cells, this threshold temperature ranges from about 90° C. to about 120° C., and more preferably from about 95° C. to about 110° C. Volatile substances include flammable olefins that are produced by the thermal decomposition of the compatible electrolyte solvents at elevated temperatures. To polymerize olefins, preferred volatile materials catalysts include acetyl peroxide (70°–90° C.), benzoyl peroxide (80°–95° C.) and azobisisobutyronitrile (50°–70° C.), which are sources of free radicals. The preferred temperature ranges at which the catalysts are used are set forth in the parentheses and represent ranges where decomposition into radicals occurs. See, for example, Odian., Principles of Polymerization, 2d Ed. (1981), pp. 194–97. Suitable volatile material polmerization catalysts for cationic polymerization of olefins include protonic (Brønsted) acids (e.g., perchloric, sulfuric, phosphoric, fluoro- and chlorosulfonic, methanesulfonic, and trifluoromethanesulfonic acids); and Lewis acids such as metal halides (e.g., $AlCl_3$, $BF_3$, $SnCl_4$, $SbCl_5$, $ZnCl_2$, $TiCl_4$, $PCl_5$) and organometallic derivatives (e.g., $RAlCl_2$, $R_2AlCl$, $R_3Al$, where R includes, for example, lower alkyls of from 1–6 carbon atoms) and oxyhalides (e.g., $POCl_3$, $CrO_2Cl$, $SOCl_2$, $VOCL_3$). See Id. at pp. 342–49. For alpha olefins, Ziegler-Natta catalysts which are a combination of (1) a transition metal compound of an element from groups IV to VIII, and (2) an organometallic compound of a metal from groups I to III of the periodic table. See M. P. Stevens, Polymer Chemistry, 2d Ed., (1990) pp. 271–95.

Depending on the components of the solid electrolytes, some solvent polymerizing catalysts may also function as volatile material polymerization catalysts, and vice versa. Moreover, the catalysts can also be microencapsulated in the appropriate heat sensitive material. This assures that the catalyst does not initiate volatile materials polymerization until the solid electrolyte temperature approaches the thermal runaway onset temperature and prevents catalyst degradation.

The amount of solvent polymerizing catalysts employed in the solid electrolyte should be effective to prevent thermal runaway by polymerizing enough solvent to increase its impedance. This amount will depend on, among other things, the catalytic activity (or initiator efficiency) of the catalyst. Generally, the solvent polymerizing catalysts should comprise, by weight percentage, between about 0.1 to about 2.0 and preferably about 0.1 and 0.5 of the solid electrolyte. If the solvent polymerizing catalysts are microencapsulated, the microcapsules (including the catalysts and heat sensitive material) should comprise, by weight percentage, between about 0.1 to about 2.0 and preferably about 0.2 and 0.8 of the solid electrolyte.

Similarly, the amount of volatile material polymerization catalysts employed in the solid electrolyte should be effective to prevent volatile materials such as olefin by-products of solvent decomposition from accumulating. The amount will depend on, among other things, the catalytic activity (or initiator efficiency) of the catalyst. Generally, the volatile materials catalysts should comprise, by weight percentage, between about 0.1 to about 2.0 and preferably about 0.1 and 0.5 of the solid electrolyte. If the volatile materials catalysts are microencapsulated, the microcapsules should comprise, by weight percentage, between about 0.1 to about 2.0 and preferably about 0.2 and 0.8 of the solid electrolyte.

Methodology

A preferred method of fabricating an electrochemical cell is described herein. In addition, methods for preparing solid electrochemical cell or batteries are described in the art, for example, in U.S. Pat. No. 5,262,253 and U.S. patent application Ser. No. 07/918,509 filed Jul. 22, 1992; U.S. patent application Ser. No. 08/049,212, filed Apr. 19, 1993, which are all incorporated herein in their entirety. The solvent polymerizing and/or volatile materials catalysts (either in free form or microencapsulated) can be added to the solid solvent-containing electrolyte at any convenient step in the fabrication of the cell or battery. When compatible, the solvent polymerizing catalysts and volatile materials catalysts can be microencapsulated in the same microcapsules.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of the inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent.

The electrolyte composition typically comprises from zero to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

The electrolyte composition comprises either the solvent polymerizing catalysts, volatile material polymerization catalysts (or both) in free or microencapsulated form in the amount described previously.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The following example illustrates a method of how an electrolytic cell could be fabricated. For this cell, 0.2 g of solvent polymerizing catalysts can be microencapsulated in 0.2 g of heat sensitive materials to form first microcapsules having a total weight of 0.4 g. In addition, 0.2 g of volatile material polymerization catalysts can be microencapsulated in 0.2 g of heat sensitive materials to form second microcapsules having a total weight of 0.4 g.

EXAMPLE

A solid electrolytic cell is prepared by first preparing a cathodic paste which is spread onto a current collector. An electrolyte solution is then placed onto the cathode surface and the cathode paste and electrolyte solution are simultaneously cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio.

The adhesion promoter layer is prepared as a dispersed colloidal solution in one of two methods. The first preparation of this colloidal solution for this example is as follows:

- 84.4 parts by weight of carbon powder (Shawinigan Black™—available from Chevron Chemical Company, San Ramon, Calif.)
- 337.6 parts by weight of a 25 weight percent solution of polyacrylic acid (a reported average molecular weight of about 90,000, commercially available from Aldrich Chemical Company—contains about 84.4 grams polyacrylic acid and 253.2 grams water)
- 578.0 parts by weight of isopropanol In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil (about 9 inches wide and about 0.0005 to about 0.001 inches thick). After application, the solvent is evaporated by placing the mixture/foil into a conventional oven. After evaporation, an electrically-conducting adhesion-promoter layer of about 4–6 microns in thickness is formed. The aluminum foil is then cut to about 8 inches wide by removing approximately ½ inch from the sides with a conventional slitter so as to remove any uneven edges; the foil can then be further cut to the desired size.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lighting Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 microns with the occasional 12.5 micron particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 microns cloth filter (e.g., So-Clean Filter Systems, American Felt and Filter Company, Newburgh, N.Y.) and coated as described above.

B. The Cathode

The cathode is prepared from a cathodic paste which, in turn, is prepared from a cathode powder as follows:

i. Cathode Powder

The cathode powder is prepared by combining 94.1±1.1 weight percent $V_6O_{13}$ [prepared by heating ammonium metavanadate ($NH_4^+VO_3^-$) at 450° C. for 16 hours under $N_2$ flow] and 5.9±1.1 weight percent of carbon (available from AKZO Chemicals, Inc., Chicago, Ill., under the tradename of Ketjen Black EC 600JD™). About 100 grams of the resulting mixture is placed into a grinding machine (Attritor Model S-1 available from Union Process, Akron, Ohio) and ground for 30 minutes starting at 150 rpm and adjusted to about 250 rpm approximately 10 seconds later and held at that speed for the remainder of the 30 minute duration. Afterwards, the resulting mixture is passed through a 200 mesh screen and then dried in a vacuum or in an inert gas atmosphere (e.g., argon) to produce a cathode powder having a moisture of preferably 700–1000 ppm.

ii. Cathode Paste

A cathode paste is prepared by combining sufficient cathode powder to provide for a final product having about 53 weight percent $V_6O_{13}$. The paste contains the following (in approximate weight percent):

| | |
|---|---|
| Ground $V_6O_{13}$/C | 56.325% |
| Unground Carbon | .375% |
| 4:1 propylene carbonate/triglyme | 31.900% |
| polyethylene oxide | 2.000% |
| polyethylene glycol diacrylate | 8.000% |
| ethoxylated trimethylol-propane triacrylate | 1.400% |

The method of preparing 100 grams of the cathode paste is as follows:

31.9 grams of a solvent having a 4:1 weight ratio of propylene carbonate: triglyme is mixed with 8 grams of polyethylene glycol diacrylate (molecular weight about 400 available as SR-344 from Sartomer Company, Inc., Extort, Pa.) and 1.4 grams of ethoxylated trimethylol-propane triacrylate (TMPEOTA) (molecular weight about 450 and available as SR-454 from Sartomer Co., Inc.) in a double planetary mixer (Ross No. 2 mixer, available from Charles Ross & Sons, Co., Hauppage, N.Y.) to form a solvent solution.

56.325 grams of $V_6O_{13}$/C, 0.375 grams of unground carbon, and 2 grams of polyethylene oxide are mixed in a V-blender before being transferred to the double planetary mixer where the blend is stirred at 7.5 Hz and 25° C. (The polyethylene oxide preferably is vacuum dried at 350° C. for three hours prior to use.) The above solvent solution is first passed through 4A molecular sieves and then added to the $V_6O_{13}$ and carbon blend under vacuum mixing over a 5 minute period. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The resulting cathode paste is maintained at about 45° C. until applied onto the current collector. The so-prepared cathode paste can be placed onto the adhesion layer of the current collector by extrusion at a temperature of from about 45° to about 48° C. The extruded cathode paste is then spread to a substantially uniform thickness of about 50–120 microns over the current collector by a comma bar.

C. Electrolyte 60.19 grams of propylene carbonate, 15.05 grams of triglyme, and 11.13 grams of urethane acrylate (Actilane SP023, available from Akcros Chemicals, Ltd., Manchester, United Kingdom) are combined at room temperature until homogeneous. The resulting solution is optionally passed through a column of 4 A molecular sieves to remove water and then mixed at room temperature until homogeneous.

At this point, 3 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent is dissolved. A thermocouple is placed at the edge of the vortex created by the magnetic stirrer to monitor solution temperature. The solution is cooled to a temperature of less than 48° C. and then 9.83 grams of $LiPF_6$ are added to the solution over a 120 minute period while thoroughly mixing to ensure a substantially uniform temperature profile throughout the solution. Cooling is applied as necessary to maintain the temperature of the solution between 45° and 48° C. The microcapsules containing the solvent polymerizing catalysts and volatile materials catalysts are added to the solution.

In one optional embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Microcapsules | 0.8 g | 0.8 |
| Propylene Carbonate | 60.19 g | 60.19 |
| Triglyme | 15.05 g | 15.05 |
| Urethane Acrylate | 11.13 g | 11.13 |
| $LiPF_6$ | 9.83 g | 9.83 |
| PEO Film Forming Agent | 3.00 g | 3.00 |
| Total | 100.00 g | 100.00 |

[a]=weight percent based on the total weight of the electrolyte solution (100 g)

This solution is then degassed to provide for an electrolyte solution wherein little, if any, of the $LiPF_6$ salt decomposes.

Optionally, the above solution which contains the prepolymer, the polyalkylene oxide film forming agent, the electrolytic solvent and the $LiPF_6$ salt, is filtered to remove any solid particles or gels remaining in the solution. One suitable filter device is a sintered stainless steel green having a pore size between 1 and 50 microns at 100% efficiency.

In the alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over 4 A molecular sieves (Grade 514, 8–12 Mesh from Schoofs Inc., Moraga, Calif.) and then proceed to step 4.

2. Dry the propylene carbonate and triglyme over 4 A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent and is light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. After the final addition of the $LiPF_6$ salt, stir for an additional 30 minutes, degas, and let sit overnight and cool.

9. Filter the solution through a sintered stainless steel screen having a pore size between 1 and 50 microns at 100% efficiency. Thereafter, add the microcapsules to the solution and mix until well dispersed.

At all times, the temperature of the solution should be monitored with a thermocouple which should be placed in the vortex formed by the mixer.

Afterwards, the electrolyte mixture is then coated by a slot die coater to a thickness of about 25–50 microns onto the surface of the extruded cathode paste prepared as above. The electrolyte and cathode paste are then simultaneously cured by continuously passing the sheet through an electron beam apparatus (available as a Broad Beam electron beam processor from RPC Industries, Hayward, Calif.) at a voltage of about 250 kV and a current of about 48 mA and at a conveyor speed of 50 ft/minute. After curing, a composite is recovered which contains a solid electrolyte laminated to a solid cathode which is affixed to a current collector.

D. Anode

The anode comprises a sheet of lithium foil (about 50 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte of the above described electrolyte/cathode composite. Lamination is accomplished by minimal pressure.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A solid electrolyte comprising:

a solid polymeric matrix;

an inorganic salt;

a solvent; and a catalyst selected from the group consisting of solvent polymerization catalysts and volatile material polymerization catalysts and mixtures thereof wherein the catalyst is microencapsulated in a heat sensitive material that melts at a temperature between about 90° C. to about 120° C., wherein said solvent polymerization catalysts cause said solvent to polymerize to form oligomers which increases the impedance of the solid electrolyte and wherein said volatile material polymerization catalysts causes volatile substances to polymerize to form oligomers which increases the impedance of the solid electrolyte.

2. The solid electrolyte of claim 1 wherein said solvent comprises propylene carbonate and wherein said volatile material polymerization catalysts are effective in polymerizing olefins.

3. The solid electrolyte of claim 2 wherein the solvent polymerization catalysts comprise ring-opening polymerization catalysts and the volatile material polymerization catalysts are selected from the group consisting of Ziegler-Natta catalysts and peroxides.

4. The solid electrolyte of claim 3 wherein said solvent polymerization catalysts have a thermal activation temperature of about 100° C.

5. The solid electrolyte of claim 1 wherein the solvent is selected from the group consisting of propylene carbonate, ethylene carbonate, gamma-butyrolactone, glyme, diglyme, triglyme, tetraglyme, dimethylsulfoxide, dioxolane, sulfolane, and mixtures thereof, wherein the solvent polymerization catalyst is selected from the group consisting of ring-opening catalysts, acids, bases, Na and $BF_3$, and wherein the volatile material polymerization catalyst is selected from the group consisting of acetyl peroxide, benzoyl peroxide, azobisisobutyronitrile, protonic (Brønsted) acids, Lewis acids, metal halides, oxyhalides and Ziegler-Natta catalysts.

6. The solid electrolyte of claim 5 wherein said solvent polymerization catalysts have a thermal activation temperature of about 100° C.

7. The solid electrolyte of claim 1 wherein the solvent polymerization catalysts comprise about 0.1 to about 2.0 percent by weight of the solid electrolyte and the volatile material polymerization catalysts comprise about 0.1 to about 2.0 percent by weight of the solid electrolyte.

8. The solid electrolyte of claim 1 wherein the catalyst is microencapsulated in the form of microcapsules which comprises about 0.1 to about 2.0 percent by weight of the solid electrolyte.

9. The solid electrolyte of claim 1 wherein the catalyst comprises volatile material polymerization catalysts.

10. The solid electrolyte of claim 1 wherein the catalyst comprises solvent polymerization catalysts.

11. An electrochemical cell comprising:
   an anode;
   a cathode; and
   interposed between said anode and cathode, a polymeric electrolyte comprising:
   (i) a solid polymeric matrix;
   (ii) an inorganic salt;
   (iii) a solvent; and
   (iv) a catalyst selected from the group consisting of solvent polymerization catalysts and volatile material polymerization catalysts and mixtures thereof wherein the catalyst is microencapsulated in a heat sensitive material that melts at a temperature between about 90° C. to about 120° C., wherein said solvent polymerization catalysts cause said solvent to polymerize to form oligomers which increase the impedance of the polymeric electrolyte and wherein said volatile material polymerization catalysts cause volatile substances to polymerize to form oligomers which increases the impedance of the polymeric electrolyte.

12. The electrochemical cell of claim 11 wherein said solvent comprises propylene carbonate and wherein said volatile material polymerization catalysts are effective in polymerizing olefins.

13. The electrochemical cell of claim 12 wherein the solvent polymerization catalysts comprise ring-opening polymerization catalysts and the volatile material polymerization catalysts are selected from the group consisting of Ziegler-Natta catalysts and peroxides.

14. The electrochemical cell of claim 12 wherein said solvent polymerization catalysts have a thermal activation temperature of about 100° C.

15. The electrochemical cell of claim 14 wherein the anode comprises lithium.

16. A battery comprising two or more electrochemical cells of claim 11.

17. The battery of claim 16 wherein said solvent comprises propylene carbonate and wherein said volatile material polymerization catalysts are effective in polymerizing olefins.

18. The battery of claim 17 wherein the solvent polymerization catalysts comprise ring-opening polymerization catalysts and the volatile material polymerization catalysts are selected from the group consisting of Ziegler-Natta catalysts and peroxides.

19. The battery of claim 17 wherein said solvent polymerizing catalysts have a thermal activation temperature of about 100° C.

20. The battery of claim 19 wherein each anode comprises lithium.

21. The battery of claim 16 wherein the solvent is selected from the group consisting of propylene carbonate, ethylene carbonate, gamma-butyrolactone, glyme, diglyme, triglyme, tetraglyme, dimethylsulfoxide, dioxolane, sulfolane, and mixtures thereof, wherein the solvent polymerization catalyst is selected from the group consisting of ring-opening catalysts, acids, bases, Na, and $BF_3$, and wherein the volatile material polymerization catalyst is selected from the group consisting of acetyl peroxide, benzoyl peroxide, azobisisobutyronitrile, protonic (Brønsted) acids, Lewis acids, metal halides, oxyhalides and Ziegler-Natta catalysts.

22. The battery of claim 21 wherein said solvent polymerization catalysts have a thermal activation temperature of about 100° C.

23. The battery of claim 16 wherein the anode is an intercalation based anode comprising carbon and wherein the cathode comprises of materials selected from the group consisting of lithiated cobalt oxides, lithiated manganese cobalt oxides, vanadium oxides, and mixtures thereof.

24. The electrochemical cell of claim 11 wherein the solvent is selected from the group consisting of propylene carbonate, ethylene carbonate, gamma-butyrolactone, glyme, diglyme, triglyme, tetraglyme, dimethylsulfoxide, dioxolane, sulfolane, and mixtures thereof, wherein the solvent polymerization catalyst is selected from the group consisting of ring-opening catalysts, acids, bases, Na, and $BF_3$, and wherein the volatile material polymerization catalyst is selected from the group consisting of acetyl peroxide, benzoyl peroxide, azobisisobutyronitrile, protonic (Brønsted) acids, Lewis acids, metal halides, oxyhalides and Ziegler-Natta catalysts.

25. The electrochemical cell of claim 24 wherein said solvent polymerization catalysts have a thermal activation temperature of about 100° C.

26. The electrochemical cell of claim 11 wherein the anode is an intercalation based anode comprising carbon and wherein the cathode comprises of material selected from the group consisting of lithiated cobalt oxides, lithiated manganese cobalt oxides, vanadium oxides, and mixtures thereof.

27. The electrochemical cell of claim 11 wherein the solvent polymerization catalysts comprise about 0.1 to about 2.0 percent by weight of the polymeric electrolyte and the volatile material polymerization catalysts comprise about 0.1 to about 2.0 percent by weight of the polymeric electrolyte.

28. The electrochemical cell of claim 11 wherein the catalyst is microencapsulated in the form of microcapsules which comprises about 0.1 to about 2.0 percent by weight of the polymeric electrolyte.

29. The electrochemical cell of claim 11 wherein the catalyst comprises volatile material polymerization catalysts.

30. The electrochemical cell of claim 11 wherein the catalyst comprises solvent polymerization catalysts.

* * * * *